UNITED STATES PATENT OFFICE.

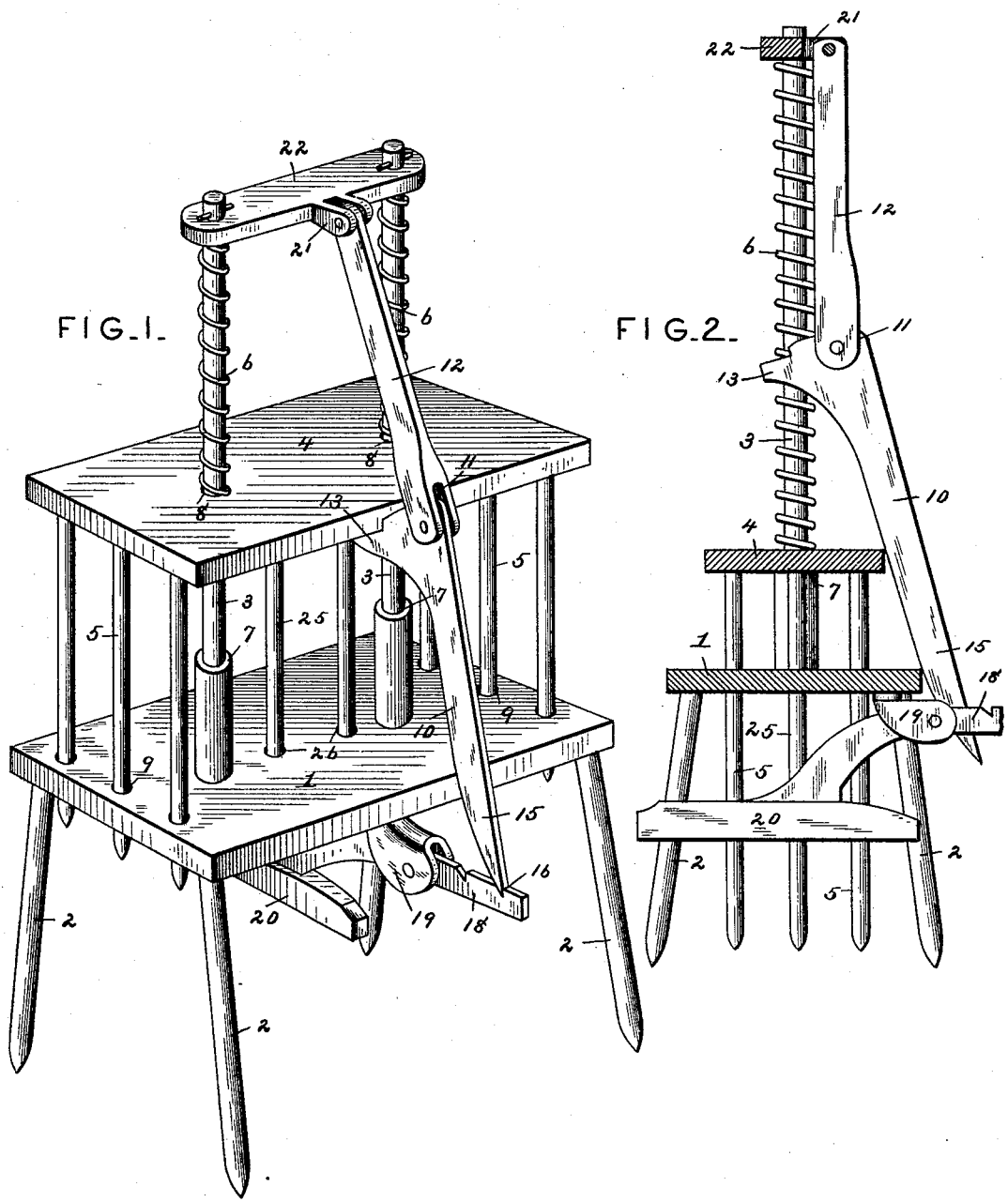

CHARLES OERTHER AND JAMES WILLIAM DILLINGHAM, OF BLUE SPRINGS, MISSOURI.

MOLE-TRAP.

SPECIFICATION forming part of Letters Patent No. 481,585, dated August 30, 1892.

Application filed May 21, 1892. Serial No. 433,893. (No model.)

*To all whom it may concern:*

Be it known that we, CHARLES OERTHER and JAMES WILLIAM DILLINGHAM, citizens of the United States, residing at Blue Springs, in the county of Jackson and State of Missouri, have invented a new and useful Mole-Trap, of which the following is a specification.

The invention relates to improvements in mole-traps.

The object of the present invention is to simplify and improve the construction of mole-traps and to increase their effectiveness.

The invention consists in the construction and novel combination and arrangement of parts hereinafter fully described, illustrated in the accompanying drawings, and pointed out in the claim hereto appended.

In the drawings, Figure 1 is a perspective view of a mole-trap constructed in accordance with this invention, the trap being set. Fig. 2 is a vertical sectional view showing the trap sprung.

Like numerals of reference indicate corresponding parts in all the figures of the drawings.

1 designates a horizontal plate, supported by outwardly-inclined legs 2, arranged at the corners of the plate and having their lower ends pointed and adapted to be driven into the ground to anchor the trap. Rising from the plate 1 near the center thereof are parallel standards 3, which are rounded and which form guides for a vertically-movable plate 4, provided with depending prongs or impalers 5, and adapted when the trap is sprung to be forced downward by spiral springs 6 to impale a mole. The spiral springs are disposed on the upper portions of the parallel standards, which are provided near their lower ends with shoulders 7, and the movable plate and the horizontal plate 1 are provided with perforations 8 and 9, the former to receive the standards and the latter to permit the passage of the impalers 5, which are arranged at the ends of the trap.

The trap is set by a bell-crank lever 10, which is fulcrumed at its angle in a bifurcation 11 of a link or connecting-bar 12, and which has a short arm 13, adapted to support the vertically-movable plate, and which has its longer arm 15 pointed and adapted to engage a notch 16 at the outer end of a trigger 18. The trigger 18 is pivoted intermediate its ends in a hanger 19, depending from the lower face of the horizontal plate 1. The inner end of the trigger extends below the horizontal plate, and is provided with a foot 20, designed to rest upon the ground and adapted to be raised to lower its outer end out of engagement with the bell-crank lever to permit the vertically-movable plate to descend to impale a mole.

The trap is arranged over a mole-run, which is constructed so that an animal in attempting to pass through will raise the foot of the trigger and spring the trap. The upper end of the link 12 is pivoted between ears 21 of a cross-bar 22, connecting the upper end to the standard. The short arm of the bell-crank lever is recessed, and it will be seen that the bell-crank lever will greatly assist the setting of the trap and enable the plate to be readily raised against the action of the spiral springs by putting the short arm beneath the plate and forcing the longer arm downward.

It will be seen that the trap is simple and comparatively inexpensive in construction, that it is exceedingly sensitive and readily sprung, and that it is securely anchored in the ground against displacement. Two impalers 25 are arranged near the center of the plate 4, and are disposed on opposite sides of the trigger mechanism and pass through perforations 26 of the plate 1. These impalers increase the efficiency of the trap and render it impossible for a mole to spring the trap without being impaled.

What we claim is—

In a mole-trap, the combination of a horizontal plate 1, provided with perforations and having depending legs with pointed ends adapted to anchor the trap, parallel standards rising from the plate, a cross-bar connecting the upper ends of the standards, a vertically-movable plate arranged on the standards and provided with depending impalers passing through the perforations of the horizontal plate 1, spiral springs interposed between the cross-bar and the vertically-movable plate, a connecting-link having its upper end pivoted to the cross-bar, a bell-crank lever fulcrumed at its angle to the lower end of the link and having a short arm to support the vertically-movable plate, and a trigger pivoted beneath the horizontal plate 1 and provided at its inner end with a foot and having its outer end adapted to engage the bell-crank lever, substantially as described.

In testimony that we claim the foregoing as our own we have hereto affixed our signatures in the presence of two witnesses.

CHAS. OERTHER.
JAMES WILLIAM DILLINGHAM.

Witnesses:
DAVID C. WALLACE,
S. L. LUTTRELL.